United States Patent [19]

Thoma et al.

[11] Patent Number: 4,686,829

[45] Date of Patent: Aug. 18, 1987

[54] ROTARY HYDROSTATIC RADIAL PISTON MACHINES

[75] Inventors: Christian H. Thoma, St. Clement; George D. M. Arnold, St. Helier, both of Channel Islands

[73] Assignee: Unipat AG, Glarus, Switzerland

[21] Appl. No.: 865,585

[22] Filed: May 21, 1986

Related U.S. Application Data

[63] Continuation of Ser. No. 590,590, Jan. 26, 1984, abandoned.

[30] Foreign Application Priority Data

Jun. 3, 1982 [GB] United Kingdom ................. 8216154

May 27, 1983 [WO] PCT Int'l Appl. . PCT/EP83/00135

[51] Int. Cl.[4] ................................................ F16D 31/02

[52] U.S. Cl. ........................................... 60/464; 60/487

[58] Field of Search ................. 60/464, 487, 489, 490; 137/512.5, 513; 91/498, 491; 417/273

[56] References Cited

U.S. PATENT DOCUMENTS

| | | | |
|---|---|---|---|
| 1,726,481 | 8/1929 | Ferris | 60/489 |
| 1,987,781 | 1/1935 | Maw | 91/498 |
| 2,227,631 | 1/1941 | Carter . | |
| 2,293,692 | 8/1942 | Wylie | 91/498 |
| 2,741,985 | 4/1956 | Parsons | 137/512.5 X |
| 2,818,707 | 1/1958 | Sturm | 60/490 |
| 2,936,589 | 5/1960 | Quintilian | 60/464 |
| 3,165,069 | 1/1965 | Adamek | 60/489 X |
| 3,404,584 | 10/1968 | Trautman | 60/487 |
| 3,433,124 | 3/1969 | Parrett | 91/501 |
| 3,435,774 | 4/1969 | Parrett | 91/501 |
| 3,521,449 | 7/1970 | Speggiorin . | |

FOREIGN PATENT DOCUMENTS

| | | | |
|---|---|---|---|
| 568722 | 7/1958 | Belgium . | |
| 1053148 | 9/1953 | France . | |
| 803228 | 10/1958 | United Kingdom | 60/490 |
| 834459 | 5/1960 | United Kingdom | 60/487 |

*Primary Examiner*—Edward K. Look

*Attorney, Agent, or Firm*—Young & Thompson

[57] ABSTRACT

A rotary radial piston pump or motor has a cylinder barrel rotating on a fixed pintle with a fluid exit at the fixed end of the pintle and an inlet at the opposite free end. A fluid impeller boosts the pressure entering the inlet and a filter prevents dirt entering. When applied to a hydrostatic transmission with pump and motor on a common pintle a pair of opposed non-return valves admit make-up fluid at one end of the pintle and a pressure relief valve provides overload relief at the other end of the pintle.

4 Claims, 6 Drawing Figures

Figure 2:
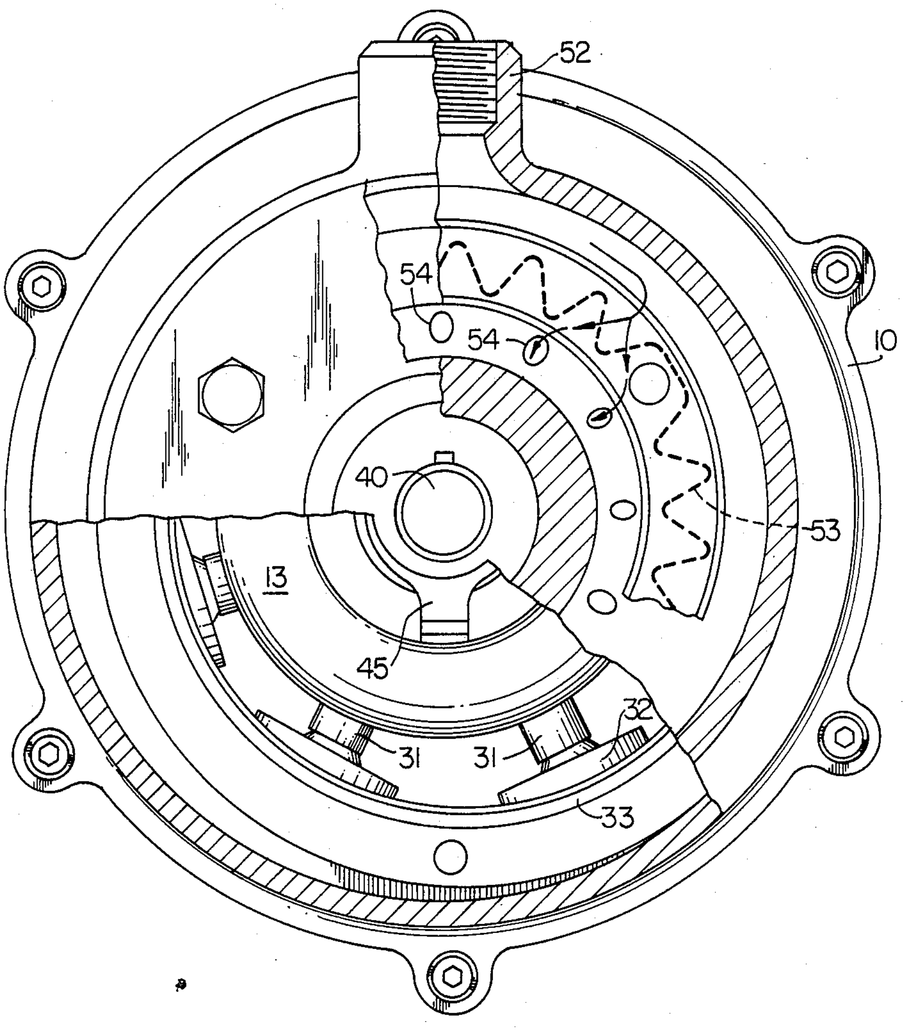

FIG. 1
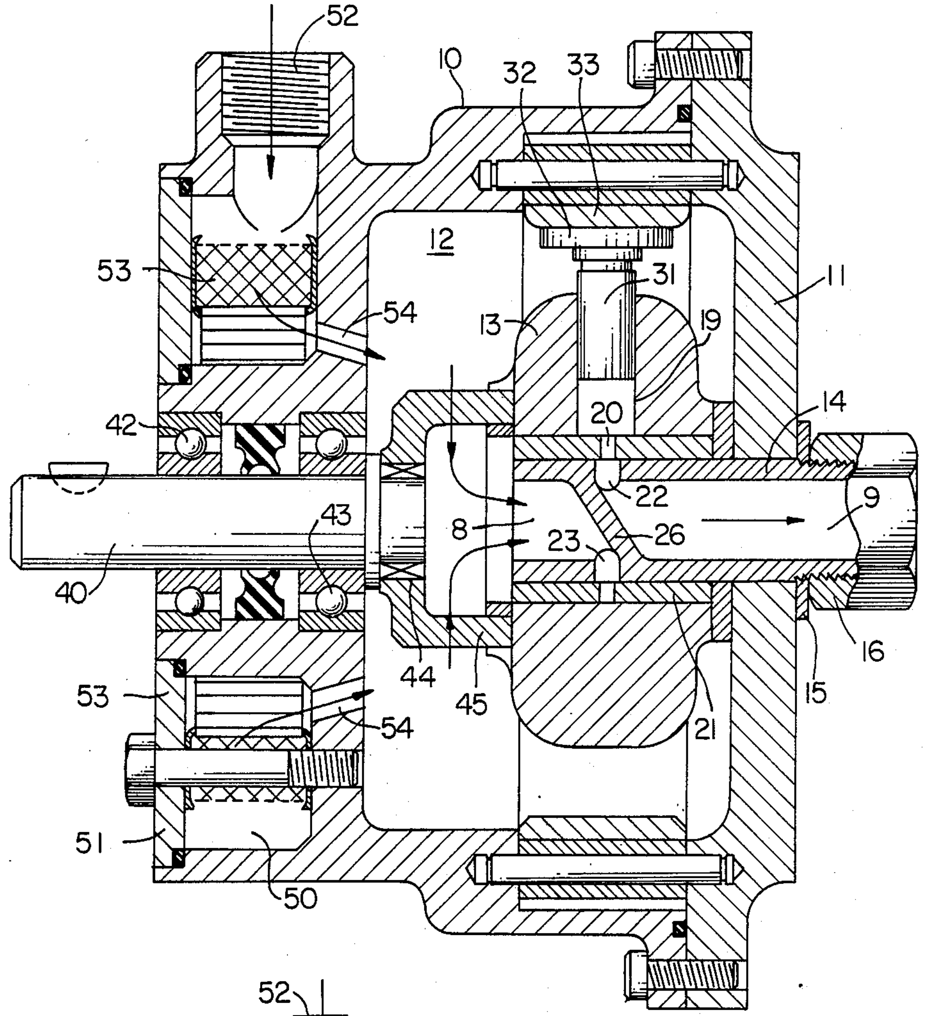
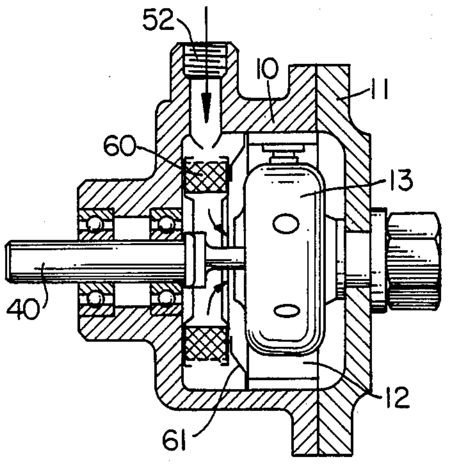
FIG. 4

ROTARY HYDROSTATIC RADIAL PISTON MACHINES

This application is a continuation of application Ser. No. 590,590, filed Jan. 26, 1984, now abandoned.

This invention relates to hydrostatic machines of the radial piston type having a rotary cylinder barrel providing a number of generally radial cylinders accommodating pistons which co-operate with a surrounding annular cam track. The machine may be a pump in which case the cylinder barrel is driven by an input shaft or it may be a motor in which case the cylinder barrel is coupled to an output shaft. The cylinder barrel rotates on a pintle formed with fluid inlet and outlet ports which communicate in succession with the radial cylinders as the barrel rotates.

Existing pumps and motors of the radial piston type suffer from various disadvantages and it is an object of the invention to provide an improved radial piston machine which will overcome some of the existing problems.

Further difficulties arise in constructing a hydrostatic transmission including radial piston pumps and motors coupled together. Existing designs tend to be expensive, difficult to manufacture, excessively large and complex. From another aspect it is an object of the invention to provide an improved simplified hydrostatic transmission of the radial piston type.

Broadly stated from one aspect the invention consists in a hydrostatic radial piston machine comprising a rotary cylinder barrel providing generally radial cylinders receiving pistons and mounted to rotate on a stationary pintle which projects from a fixed end wall of the machine casing, the pintle providing a fluid inlet and a fluid outlet port to communicate with the cylinders, the two ports being connected respectively to passages which extend towards opposite ends of the pintle.

Preferably, the inlet passage is located adjacent the free end of the pintle where the cylinder barrel is connected to a drive shaft, and the outlet passage extends in the opposite direction. It will be understood that the invention enables the two fluid ports or ducts to be larger than would be possible with the two ports extending in the same direction, and also improves the strength of the pintle.

Conveniently, one of the passages extends internally along the pintle where it passes through a fixed end wall of the machine casing.

From another aspect the invention consists in a radial piston as defined including means for boosting the low pressure inlet to the machine comprising a fluid pump or impeller coupled to the cylinder barrel, and mounted within the casing of the machine.

From yet another aspect the invention consists in a radial piston machine as defined, including a fluid filter mounted on or within the casing and arranged to filter the fluid entering the inlet port.

From another aspect the invention relates to a hydrostatic transmission including a radial piston pump coupled to a radial piston hydrostatic motor the pump and motor each comprising a rotary cylinder barrel providing generally radial cylinders which accommodate pistons co-operating with a surrounding annular track, both cylinder barrels being mounted on a common fixed pintle provided with internal fluid flow and return passages which form a closed hydrostatic circuit. Preferably the pintle is provided with a non-return valve communicating with the machine chamber and arranged to open automatically to admit make-up fluid to the circuit.

Figure 3:
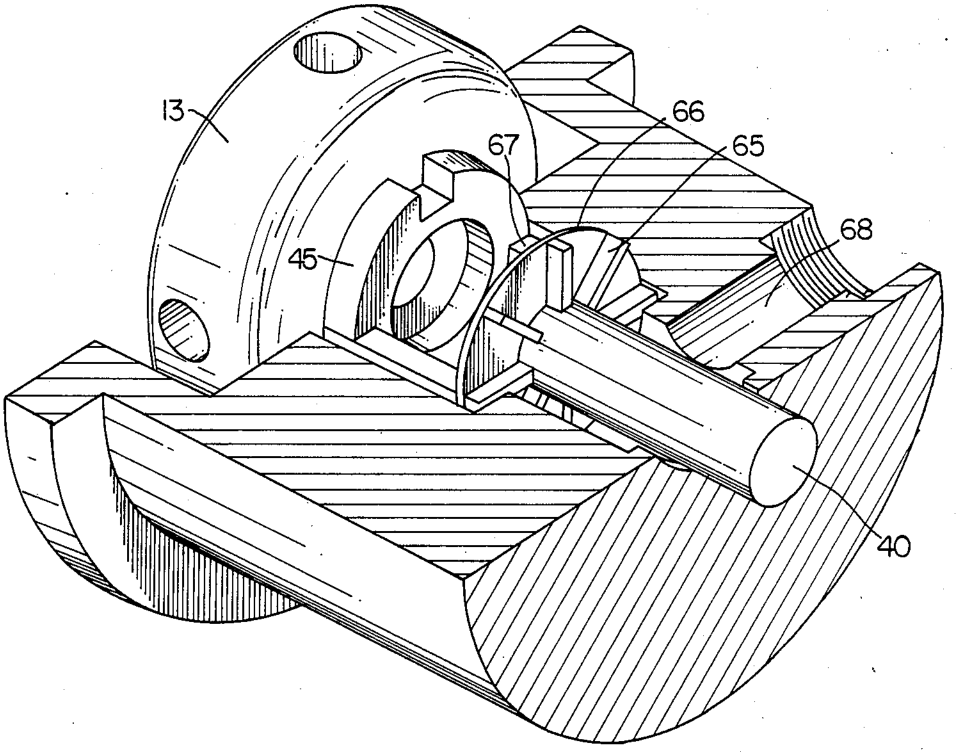
Figure 5:
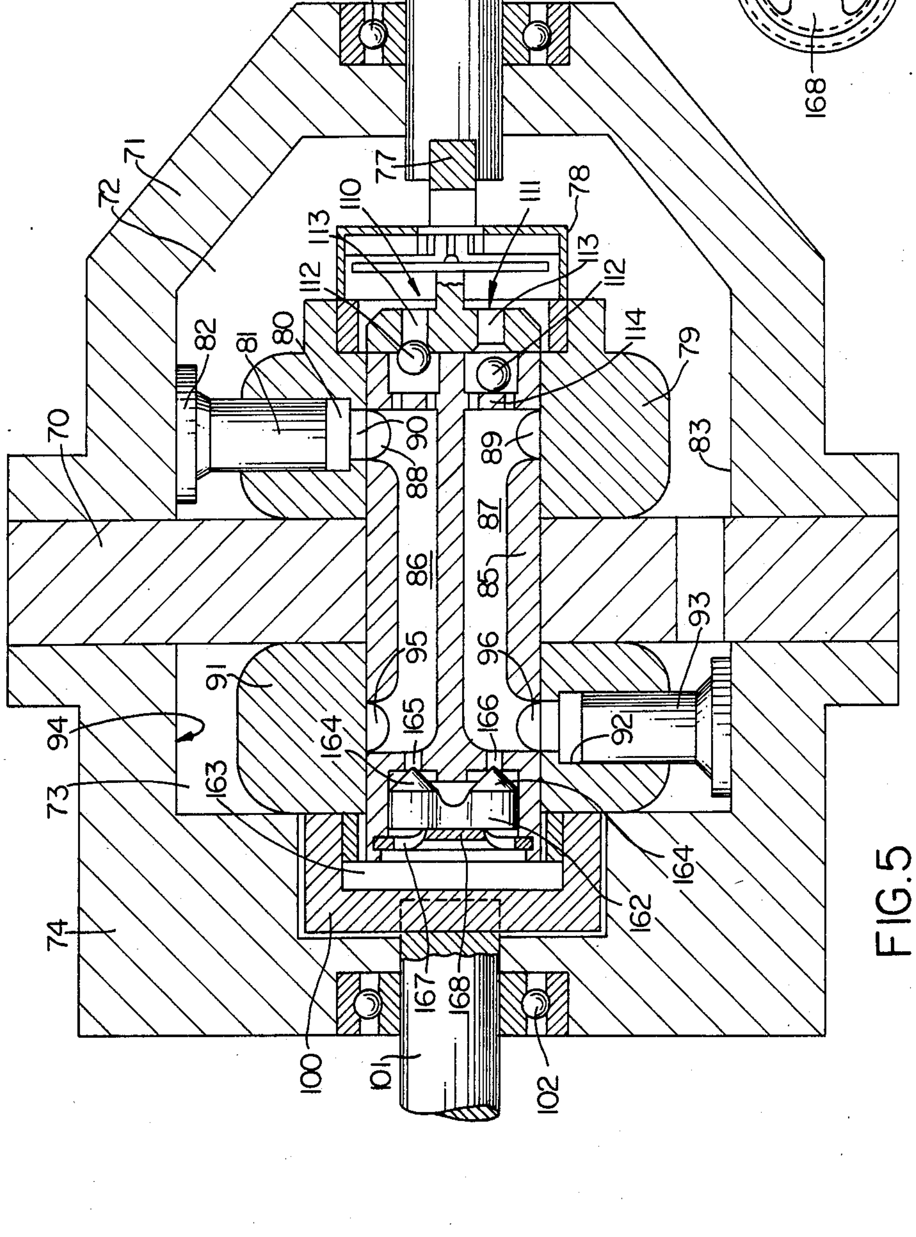
Figure 6:
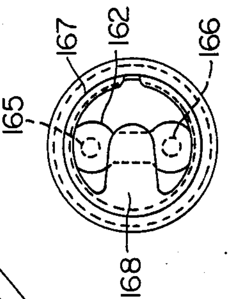

The invention may be performed in various ways and four specific embodiments with some possible modifications will now be described by way of example with reference to the accompanying drawings, in which:

FIG. 1 is a sectional side elevation through a radial piston hydraulic pump according to the invention, FIG. 2 is an end view thereof partly in section, FIG. 3 is a perspective view illustrating a possible modification, FIG. 4 is a similar sectional side elevation illustrating a further example, FIG. 5 is a sectional side elevation through a hydrostatic transmission according to the invention, including hydrostatically coupled pump and motor, FIG. 6 is an end view illustrating the valve spring of the FIG. 5 embodiment.

In the pump illustrated in FIG. 1, the casing 10 has an end cover 11, which together form an enclosed chamber 12 in which is located a rotary cylinder barrel 13 mounted for rotation on a fixed pintle 14 which extends through the end wall 11 and is rigidly secured by means of the washer 15 and lock nut 16. The rotary cylinder barrel 13 has a number of radial bores 19 each of which communicates with a small radial port 20 formed in a sleeve 21 which rotates with the cylinder barrel. The ports 20 communicate in succession with two arcuate supply ports 22,23 formed in the wall of the hollow pintle. The right-hand end 9 of the hollow interior of the pintle is separated from the left-hand end 8 by an inclined partition wall 26 and the port 22 communicates with the right-hand exit end 9 while the port 23 communicates with the left-hand entry end 8.

Mounted within each of the radial bores 19 is a cylindrical piston 31, which has a ball joint at its outer end engaging a slipper 32, which moves around an arcuate ring or cam track 33 which is eccentrically positioned relative to the pintle. Thus as the cylinder barrel 13 rotates the pistons are caused to move radially inwards and outwards in the respective bores, fluid being drawn in from the left-hand end of the pintle and expelled from the right-hand end.

The cylinder barrel is driven by a drive shaft 40 which is mounted in bearings 42,43 at the left-hand end of the casing and is connected via splines or a dog clutch 44 to a universal drive coupling including an Oldham element 45.

Within the left-hand end of the casing 10 is an annular filter chamber 50 closed by an annular plate 51 and the hydraulic fluid supplied to the pump enters through a radial port 52 and is caused to flow radially inwards through an annular filter unit 53 subsequently passing through passages 54 into the pump chamber 12 from which the fluid passes to the entry end 8 of the pintle.

This arrangement has a number of important and surprising advantages. The fact that the pintle has an entry at one end and an exit at the opposite end means that each flow passage can occupy substantially the whole available cross-sectional area. In this example the area of each passage 8 and 9 is greater than one half of the cross-sectional area of the pintle 14. Alternatively for a given diameter of the pintle the size of the flow passage can be increased with further benefits. Machining and casting operations are greatly simplified compared with the pintle having two or more parallel flow passages. It is possible to machine the exterior surface of the pintle economically by centreless grinding and the internal inclined partition wall 26 improves the strength of the pintle in an important zone.

The inclusion of the filter 53 within the pump body also results in simpler machining and casting operations, avoids the need for connecting pipework and yet allows ready access to the filter by removal of the closure plate 51.

In the modification illustrated in FIG. 4, many of the components are similar to those in the example described and are indicated by the same reference numerals. In this case the filter 60 is physically located within the actual pump chamber 12 being separated therefrom by an internal annular wall 61. This further simplifies the manufacturing operations and reduces the overall size. The filter element in this example cannot be removed merely by opening up the closure plate 51. It would be necessary to separate the end wall 11 of the pump and dismantle the whole pump rotor. However, this construction is of particular utility where the hydraulic fluid is expected to be substantially clean and the filter life is as long as the whole life of the pump itself.

In the further possible modification illustrated in FIG. 3, the drive shaft 40 is connected to a small radial vane centrifugal impeller 65, including a plate 66 having dogs 67 which form part of the flexible drive. This centrifugal impeller acts as a boost pump to prime or boost the oil pressure entering the inlet end of the pintle via port 68.

In the example illustrated in FIG. 5 the invention is applied to a hydrostatic transmission comprising a coupled pump and motor. The pump is located in a chamber 72 formed between a "sandwich" plate 70 and an end cover 71 and the motor is positioned in a chamber 73 formed between the same sandwich plate 70 and an end cover 74. An input drive shaft 75 is mounted in bearing 76 in the pump cover and is connected via an Oldham coupling 77 and a coupling element 98 of greater diameter than the pintle 85 which supports the barrel 79, to a rotary pump cylinder barrel 79. This has a number of radial bores 80 in each of which is mounted a sliding piston 81 coupled to a slipper 82 engaging a surrounding eccentric cam track 83.

The cylinder barrel 79 is mounted to rotate on a fixed pintle 85, which passes through and is rigidly mounted in the sandwich plate 70. The pintle is formed with two internal parallel passages 86,87 which communicate respectively with arcuate ports 88,89 in the external surface of the pintle, these ports communicating in sequence with flow ports 90 at the inner ends of the radial cylinder bores 80.

The motor unit likewise comprises a rotary cylinder barrel 91 mounted to rotate on the opposite projecting end of the pintle 85 and having radial cylinder bores 92 accommodating sliding pistons 93 which engage a surrounding cam track 94. The same two passages 86,87 in the pintle communicate with arcuate ports 95,96 which open in sequence to the inner ends of the radial bores 92.

The rotary motor barrel 91 is connected via an Oldham coupling 100 to an output drive shaft 101 mounted in a bearing 102 in the cover.

Thus rotation of the input drive shaft 75 causes rotation of the pump barrel 79 and consequent radial movement of the pistons 81, which cause fluid to flow out along passage 86 and to return along the passage 87. This flow causes corresponding movement of the motor pistons 93 and hence rotation of the motor barrel 91 and of the output shaft 101. By appropriate selection or adjustment of the eccentricity of the cam tracks 83,94 the transmission ratio can be selected or adjusted, as required.

In such a hydrostatic drive the hydraulic circuit between pump and motor is an enclosed system, but it is necessary to provide make-up fluid to compensate for the small leakage losses which occur. In this design the make-up fluid is supplied automatically by means of a pair of non-return valves 110,111 positioned at one end of the pintle in line with the respective flow passages 86,87 and closer to the end of the pintle than the respective pistons 81. Each valve includes a ball 112 which can selectively seat in the end of a corresponding port 113 or may be loosely trapped within a pocket formed by a perforated end wall 114. Thus when the passage 86 is under pressure the ball of the valve 110 is automatically moved to close the exit port while the ball of the other valve 111 moves away to open the port 113. This allows oil to be drawn into the lower flow passage 87 of the pintle to compensate for any leakage losses. This design is extremely simple and economical to manufacture, avoids the necessity for any drillings or flow passages in the sandwich plate 70, and is a totally enclosed automatic feature of the transmission.

The construction also includes a built-in pressure relief valve to release pressure from the closed fluid circuit in the case of overload conditions. The transmission may operate in either the forward or reverse direction and pressure relief is needed for both states. This is provided by the twin pressure relief valve system shown at the left-hand end of the fixed hollow pintle. A movable valve element 162 is positioned in a chamber 163 at the end of the pintle, the valve element having a pair of cones 164 which engage respectively in two pressure ports 165,166 communicating with the two internal passages in the pintle. The valve element is urged towards a closed position by a spring 167 in the form of a split circular rim with an integral central leaf spring or finger 168, as shown in FIG. 6. By careful selection of spring stiffness and material the valve is arranged to lift and open only when the pressure in either one of the two galleries 86,87, exceeds the selected value. The valve element will lift from both ports simultaneously and therefore pressure fluid escaping from one of the galleries can be returned directly into the other gallery, thus avoiding possible cavitation problems.

We claim:

1. In a hydrostatic transmission comprising a casing; an internal transverse partitioning wall dividing said casing into first and second chambers; a pintle fixedly and non-rotatably mounted in said partitioning wall, said pintle having first and second ends extending into said first and second chambers, respectively, and internal parallel first and second hydraulic fluid passages terminating in ports; a rotary cylinder barrel rotatably mounted on each of said first and second extending pintle ends, each said barrel comprising a plurality of radially arranged cylinders and a plurality of pistons disposed in said cylinders, said cylinders successively communicating with said ports during rotation of said barrels; an annular cam track surrounding each said barrel, said pistons engaging said cam track; first and second rotary shafts rotatably mounted in said casing and extending into said first and second chambers, respectively; and means coupling said shafts to said barrels; the improvement in which: a non-return valve is mounted in at least one of said first and second pintle ends, said valve admitting make-up fluid to a said fluid passage when pressure in said chamber corresponding to said at least one end exceeds that in said passage; and said coupling means exposes said at least one pintle end, and hence said valve, to said corresponding chamber.

2. Hydrostatic transmission according to claim 1, and a pair of pressure relief valves closing said first and second fluid passages, said valve pair being disposed at said first pintle end and said non-return valve being mounted in said second pintle end.

3. Hydrostatic transmission according to claim 1, wherein a separate said non-return valve is associated with each of said first and second fluid passages.

4. Hydrostatic transmission according to claim 1, wherein said cylinders are closer to said partitioning wall than said non-return valve.

* * * * *